(12) United States Patent
Webster et al.

(10) Patent No.: US 10,469,648 B2
(45) Date of Patent: Nov. 5, 2019

(54) AUTOMATIC PAIRING OF DEVICES TO NETWORK ACCESS POINT

(71) Applicants: David Webster, Morrisville, NC (US); John Anderson, Morrisville, NC (US); Manjiri Kshirsagar, Morrisville, NC (US); Ryan Corbin, Morrisville, NC (US)

(72) Inventors: David Webster, Morrisville, NC (US); John Anderson, Morrisville, NC (US); Manjiri Kshirsagar, Morrisville, NC (US); Ryan Corbin, Morrisville, NC (US)

(*) Notice: Subject to any disclaimer, the term of this patent is extended or adjusted under 35 U.S.C. 154(b) by 134 days.

(21) Appl. No.: 14/933,471

(22) Filed: Nov. 5, 2015

(65) Prior Publication Data
US 2017/0134556 A1    May 11, 2017

(51) Int. Cl.
*H04M 1/725* (2006.01)
*H04W 12/08* (2009.01)
*H04W 12/00* (2009.01)
*H04L 12/28* (2006.01)
*H04W 84/12* (2009.01)

(52) U.S. Cl.
CPC ..... *H04M 1/72533* (2013.01); *H04W 12/003* (2019.01); *H04W 12/08* (2013.01); *H04L 12/2803* (2013.01); *H04L 2209/805* (2013.01); *H04W 12/00516* (2019.01); *H04W 84/12* (2013.01)

(58) Field of Classification Search
CPC ........... G05B 15/02; G05B 2219/2642; H04W 12/06; H04W 12/08; H04W 84/18; H04W 8/005; H04M 1/7253; H04M 1/72533
See application file for complete search history.

(56) References Cited

U.S. PATENT DOCUMENTS

| | | | | |
|---|---|---|---|---|
| 2013/0024685 | A1* | 1/2013 | Kolavennu | H04L 41/0806 713/153 |
| 2015/0327069 | A1* | 11/2015 | Fu | H04W 12/06 726/5 |
| 2016/0028697 | A1* | 1/2016 | Shui | H04W 84/18 713/168 |
| 2016/0249213 | A1* | 8/2016 | Wong | H04L 63/0876 |

* cited by examiner

*Primary Examiner* — Margaret G Mastrodonato
(74) *Attorney, Agent, or Firm* — John L. Sotomayor

(57) ABSTRACT

This document presents a system and method for defining and controlling lights, audio systems, and any other home automation device by connection with an exterior network access port. The exterior network access is accomplished by pairing all network capable devices with a known intermediate network maintained by a master control unit. After association with the known intermediate network, the exterior network SSID and passkey are provided to the master control unit and then transmitted to each network capable device. The network capable devices connect to the exterior network by replacing the intermediate SSID and passkey information with the exterior network information.

16 Claims, 5 Drawing Sheets

AUTOMATIC PAIRING OF DEVICES TO NETWORK ACCESS POINT

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

This innovation relates generally to the home automation market. In a home automation system, many different electrical and mechanical elements can be controlled via electrical connection into one or more electrical circuits. Many times, a user may wish to control these elements synchronously via a single action such as selecting a switch or pressing a button. An electrical circuit may be configured to activate and deactivate a multitude of devices providing light, audio, temperature control, security control and any other functions that an owner of a property may wish to have under automated control.

Home automation may also consist of input and decision control such that timers and other delay devices may be employed to activate circuit control when an owner is not present. Configuring a home automation system may include the attachment of a decision execution device such as a computer processor connected to the input of the electrical circuit to process actions associated with decisions desired by the home owner.

Increasingly, home automation includes connections to devices not only in multiple locations within a home, but also requires connections to external locations. These external connections may include connections to a public network, private network, intranet, specialized devices or networks, or the Internet. Facilitating connections to such exterior locations may require specialized processes to insure timely and optimized connections and communications over such external channels once a connection has been completed successfully.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
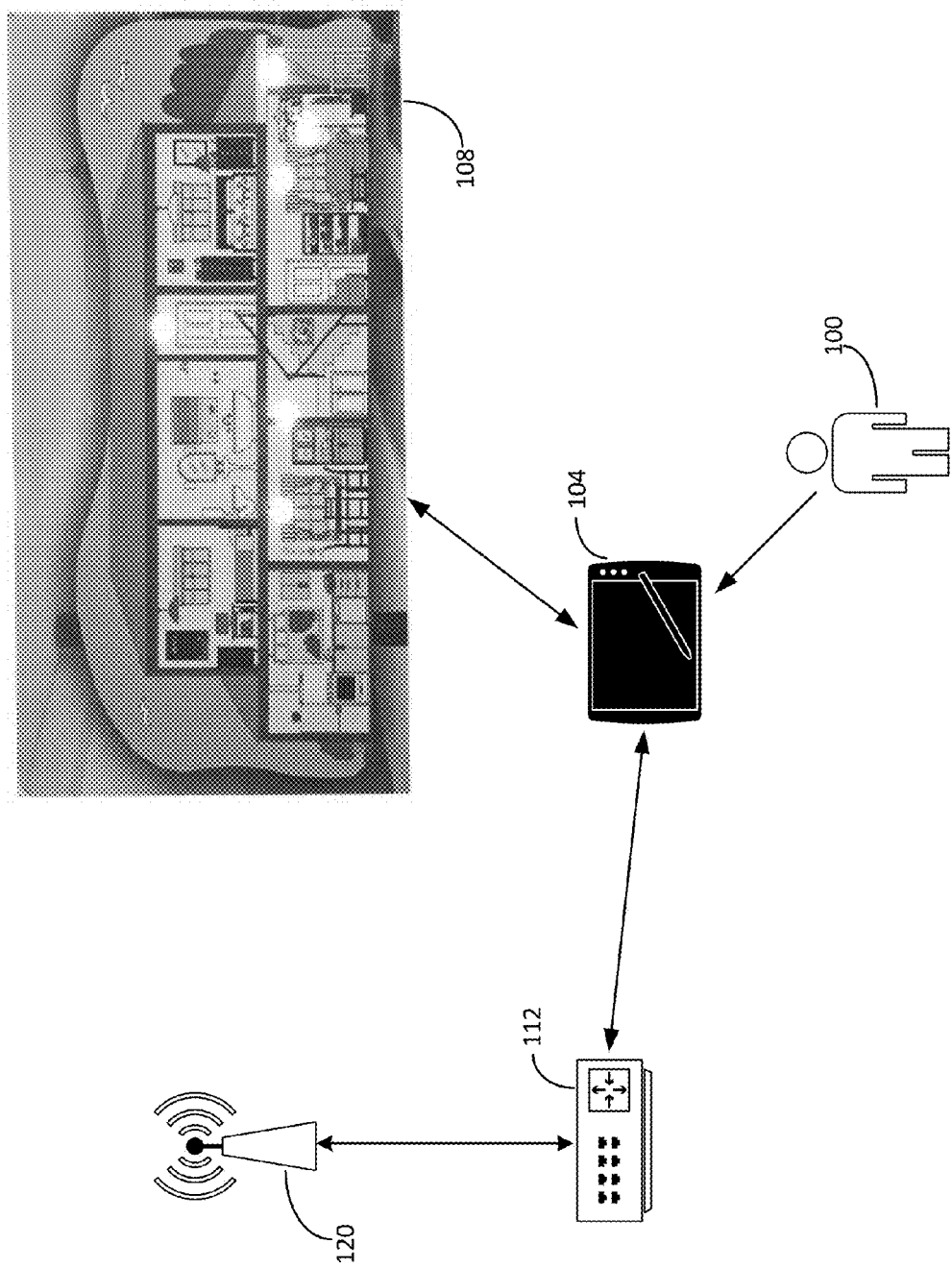
FIG. 1 is a view of a system component configuration consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to "mobile device" refers to any handheld device such as, but not limited to, a cell phone, smart phone, tablet, iPad, networked computer, internet computer, watch or any other device a user may carry when travelling from place to place and interact with one or more networks.

A common issue in wireless based automation systems is how to pair or associate particular devices installed within one or more spaces with the system central hub or network access point to facilitate internal or networked control of one or more devices, or groups of devices. In the case of WiFi, the network identifier, or Service Set Identifier (SSID), is commonly selected from a list of available networks shown on the display of a PC or mobile device and the password is entered via a keyboard or touchscreen input to permit access to the particular device or group of devices. For devices or groups of devices that do not have a complex user interface a user often has a cumbersome input capability. Common methods to pair these types of devices with an access point require a complicated set of button presses on both the access point and the device resulting in difficult and unreliable pairing, the pairing action also requiring a substantial amount of time to complete due to the need to manually pair each device. In a particular example, a WiFi enabled light-switch does not provide a user interface to view available networks or enter a password for a given network. The user interface is restricted to activation buttons built into the device, with the sequence of button presses being interpreted by the receiving processor as the user interacts with the device.

In an exemplary embodiment, an improved automatic association process for pairing these types of devices is presented herein. The automatic association process leverages the ability of a WiFi access point to provide access to multiple networks via unique SSIDs. In the automatic association process, when a user wishes to pair a device that is not currently associated with or attached to a network, the access point can provide a second network to which a number of devices may be associated, or paired, temporarily through manual configuration or through a PC or mobile application. This second network's SSID is programmatically determined such that approved devices can scan for this specific network. This second network's SSID is available on the PC, iPad, or mobile application with which each device is in communication. Additionally, the credentials required for this secondary network can be calculated using a chosen algorithm. These two key details allow an unpaired device to discover and connect to the association network, after which, the primary network, which is the external network permitting each device to contact and communicate with external servers and devices, has a name and passkey that may be passed over secure channels. When the primary network's name and passkey is received by the device, the device simply disconnects from the association network and connects to the primary network, completing the automatic association process.

In an exemplary embodiment, for the automatic association action, each device may be configured to transmit an activation signal to the main processor of the system when the portion of the physical component is selected. The selection of the portion of the physical component that forms the control button may be performed through touching the control button, or through an activation signal from a handheld unit such as a smart phone, tablet, internet computer, or other handheld device. A physical component of the system, such as, in a non-limiting example, a light dimmer switch, may be selected to be associated with the secondary network by adding the device to an association data base. The light dimmer switch may be configured to automatically calculate the passkey for the secondary network and pair with the secondary network when the pairing list is selected by a user.

In an embodiment, the primary benefits to network association include simplification of use of a home automation system and the ability to control elements that are not electrically connected to each other and are located remotely from the master control unit. In the first instance, the action groups allow users to more efficiently execute multiple desired actions simultaneously. In the second instance, the ability to control "remote" elements, those that are not electrically connected to each other may include, in a non-limiting example, elements located in one physical location, such as a house or other building, and elements located in a second physical location, such as a detached garage, outbuilding, guard shack, or any other physical location. Each element must be configured within and addressable by the master control unit to permit a control signal to be sent through a network communication channel when a control button is selected. Network capable devices may be a device operable to control any of a light, light system, sound system, multimedia device, multimedia system, temperature control, network capable appliance, or any device installed to operate a device or system associated with a commercial or residential space. Pairing each network capable device with an external network simplifies ability to send control signals to each physical device so as to create control over each network capable device, as well as permitting existing installations to keep their current electrical wiring yet still receive the advantage of control through a command communicated through a network.

In addition to devices and control actions that are defined in the system, the user may have the ability to add new devices to a pairing action list in a dynamic fashion. In a non-limiting example of this configuration update capability, each network capable device is attached to an association network that is maintained and managed by the master control unit. The association network has a known SSID that is installed within each network capable device as a part of the initial configuration at the factory. Additionally, the association network passkey is based upon a calculation that may be performed within the network capable device so as to permit each network capable device to derive the association network passkey. With the association network SSID and passkey, each network capable device may then establish a connection, or 'pair with', the association network.

In this exemplary embodiment, the master control unit may connect to an exterior network through the entry by a user of the SSID and passkey of the exterior network. The master control unit may then pass the external network SSID and passkey to each network capable device upon the initiation of a pairing action with the external network. Each network capable device may then replace the association network SSID and calculated passkey with the exterior network SSID and passkey to change network connection from the association network to the exterior network. The master control unit may now connect to all network capable devices through the exterior network channel. At the completion of this process, all network capable devices in a space are configured to connect with an exterior network with a minimum of user intervention.

Turning now to FIG. 1, this figure presents a view of a system component configuration consistent with certain embodiments of the present invention. In an exemplary embodiment, a user 100 connects to the home automation interface unit 104, which may be a tablet, network computer, iPad, or other mobile device having an internal processor and network communication capability. The interface unit 104 may be in communication with the one or more physical spaces 108 in which home automation capable devices are installed. The home automation devices may be light switches, dimmer switches, sound systems, colored lighting devices, thermostats, rheostats, network capable appliances, or any other device that performs a control action for sound, lighting, temperature control, or serves as a control point for a particular device within the physical space 108.

In a non-limiting example, the physical space 108 may be a residential dwelling having any number of devices to control lighting, sound, temperature, or other devices within the residential dwelling. To initialize the system and provide control over all of the home automation devices within the residential dwelling, each home automation device must be network communication capable and be associated with a network. The association with a network permits a user to establish a network enabled communication link between the master control unit 112 and each device within the residential dwelling. The master control unit 112 may then facilitate the connection and communication with an external network access point 120.

In this non-limiting example, external network access point 120 name and password identifiers are different for each system installation. However, each network capable device is pre-configured with the ability to programmatically determine a network SSID maintained in the master control unit 112. Approved network capable devices can scan for this specific network and create an association between the network capable devices and the master control unit 112 without the intervention of a user or creation of a user interface for each network capable device.

In this exemplary embodiment, a user 100 may initiate the association action between all network capable devices within the residential space 108. Once all devices have scanned for and connected to the network maintained by the master control unit 112, each network capable device is associated with this network.

The master control unit 112 may then establish a connection with the external network access point 120 through the use of the home automation interface unit 104. The user 100 may be requested to enter the physical name and password for the external network access point 120. Upon entering this information one time, the master control unit 112 passes the external network access point information to each network capable device that is attached to the network maintained by the master control unit 112. Each network capable device may then drop the connection with the network maintained by the master control unit 112 and establish a network connection with the external network access point 120. In this manner, each network capable device achieves a network communication channel connection, permitting a user 100 to access and control all network capable devices installed and configured within the residential dwelling.

Figure 2:
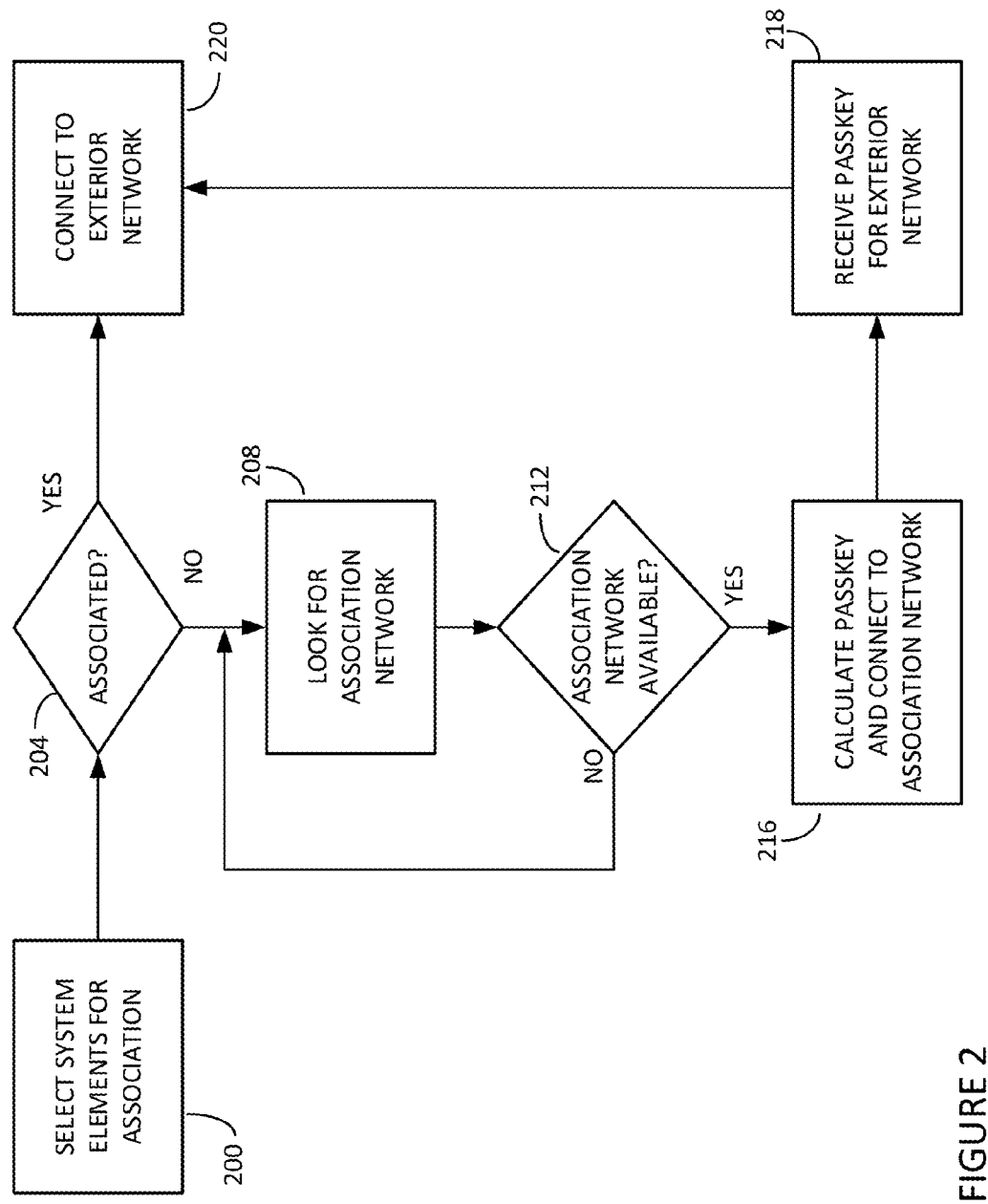
FIG. 2 is a view of a process flow for the automatic association of multiple devices with an exterior network consistent with certain embodiments of the present invention.

Turning now to FIG. 2, this figure presents a view of a process flow for the automatic association of multiple devices with an exterior network consistent with certain embodiments of the present invention. In an exemplary embodiment, the ability of network capable devices to connect to and communicate with an external network may begin with a user selecting network capable devices that are installed within a physical space as system elements 200. The user selects network capable devices and saves them in a network association list. The master control unit may then look for an association network that has been established within the master control unit 212. In this exemplary embodiment, if the association network is not currently discoverable or available the master control unit looks for the association network 208 until the association network is available.

If the association network is discovered, the network capable device is authorized to calculate the association network passkey and, utilizing the calculated network passkey, the network capable device establishes a network connection to the association network 216. Through the established network to the association network within the master control unit, the master control unit retrieves the name and passkey for an exterior network to which the network capable devices are to be connected. The exterior network selection, name and passkey are provided to the master control unit by a user. The master control unit may then communicate the name and passkey of the exterior network to the network capable device 218. The network capable device then replaces the name and passkey for the association network with the name and passkey for the exterior network. The network capable device may then connect directly to the exterior network 220.

The master control unit selects the next network capable device in the device list and determines whether the network capable device has an established network connection with the association network 204. If the network capable device does not have an established connection, the master control unit initiates the association process steps for the network capable device. The association of network capable devices with the association network in the master control unit continues until all network capable devices have established network connections with the association network and with the exterior network.

Figure 3:
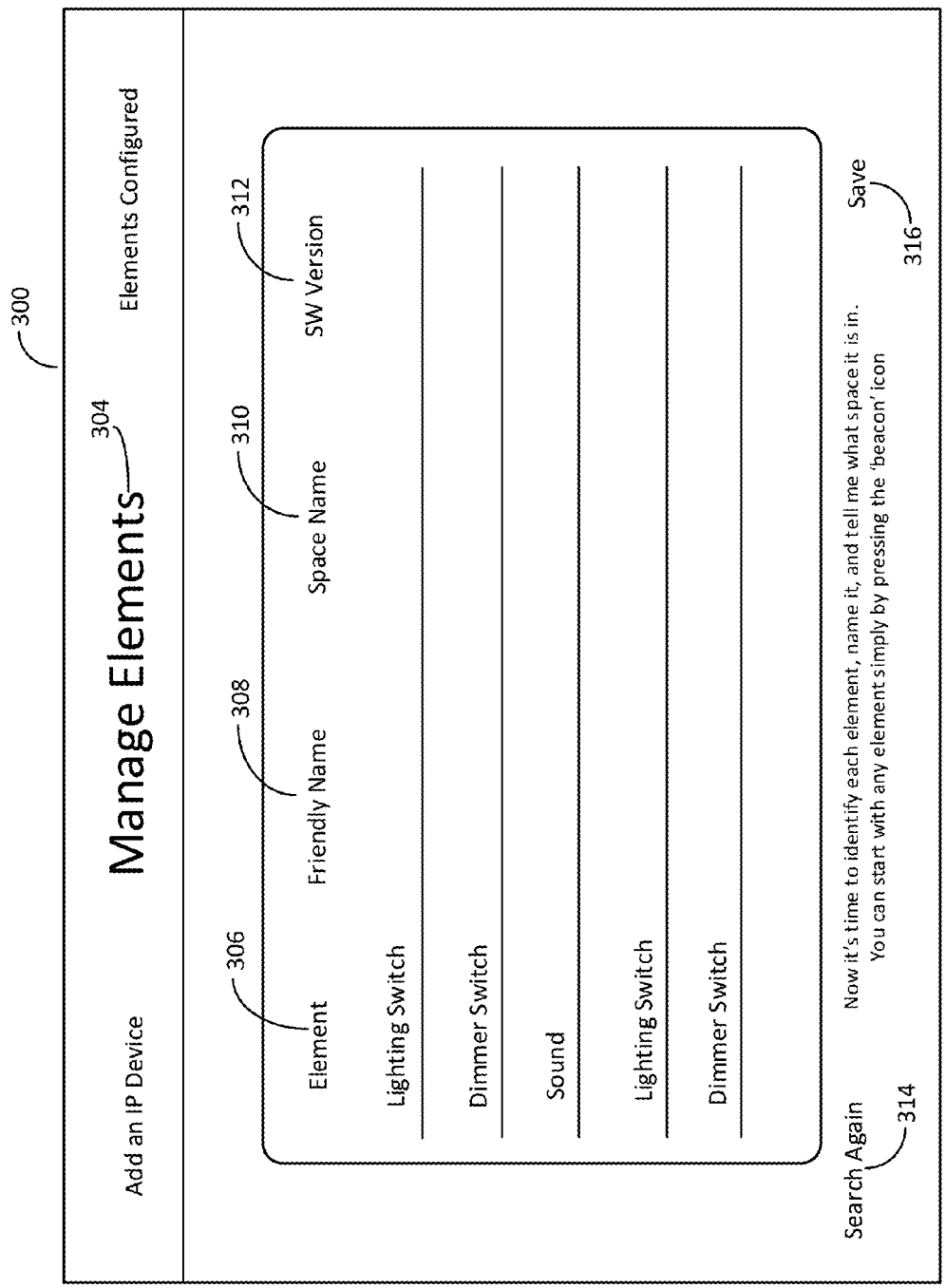
FIG. 3 is an exemplary view of a set of system elements that may be included in a network pairing action consistent with certain embodiments of the present invention.

Turning now to FIG. 3, this figure presents an exemplary view of a set of system elements that may be included in a network pairing action consistent with certain embodiments of the present invention. In an exemplary embodiment, the user may build a list of network capable devices for which network association and pairing is to be performed. The user is presented with a management display 300 that may contain the commands and control to manage the inclusion or removal of network capable devices from the network association and pairing list 304. Network capable devices are identified as elements by the user including them in an element list 306. Additional parameters associated with the elements may include additional naming, such as, in a non-limiting example, a known or "friendly" name 308, a space name 310 with which the element is to be associated, and an indication of the software version for the management software 312. These naming conventions should be considered as examples of the naming indicators and should in no way be considered limiting as alternative naming conventions may be utilized within the system.

In this exemplary embodiment, the user may have a search function available for use 314 in locating and identifying elements to be included in the element list 306. A user may select the search function 314 and be presented with an element, either by a name or other element identifier. The user may be given the option to select the discovered element or restart the search to locate other elements available for inclusion in the element list 306. The user may be given the option to modify, amend, or change the name of the discovered element to a "friendly" name 308. The user may also be provided with the option to enter the name of the space 310 in which the element is installed. When all elements have been discovered and added to the element list 306 in which the user has an interest, the user may be presented with an option to save 316 the selected list and additional information into the element list data table maintained by the master control unit. This element list data table may later be retrieved by the master control unit to permit the network association process to proceed.

Figure 4:
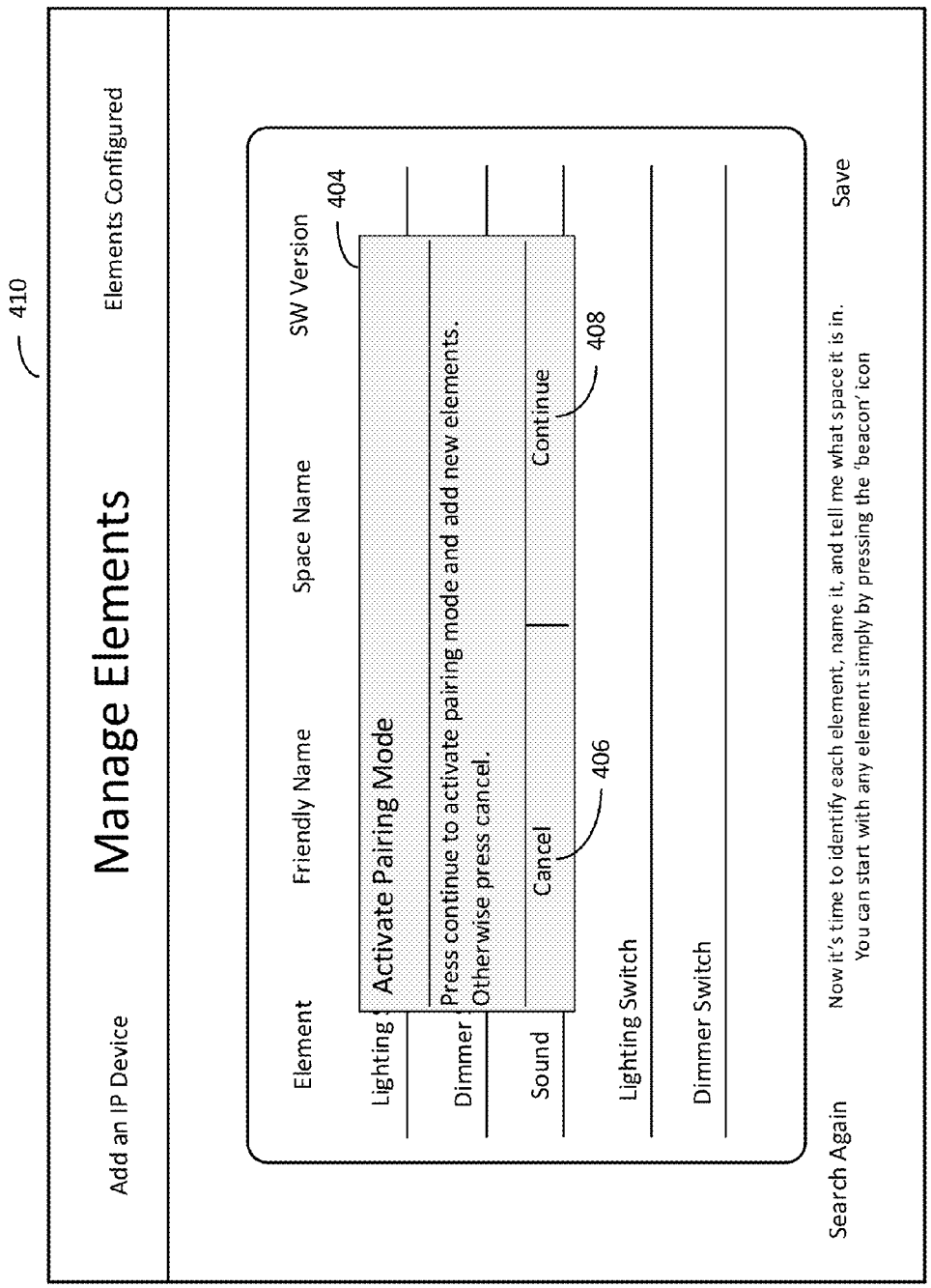
FIG. 4 is an exemplary view of a network pairing mode activation notification consistent with certain embodiments of the present invention.

Turning now to FIG. 4, this figure presents an exemplary view of a network pairing mode activation notification consistent with certain embodiments of the present invention. In an exemplary embodiment, a user may elect to begin the network association steps at any time. To begin, the user selects the "Activate Pairing Mode" 404 indicator. The selection of this indicator permits the master control unit to access the element list and to begin the steps for each element, or network capable device, to calculate the passkey needed to connect the element to the association network established within the master control unit. The selection of the "Activate Pairing Mode" 404 indicator also permits the user to add new elements to the element list.

The user may select the "continue" button 406 to initiate the pairing process or to add new elements to the element list. The user may be presented with the option to continue to add new elements by restoring the element list and permitting the user to input data into the screen. In an alternative response, the user may be presented with an initiate selection box. If the user selects the initiate selection box, the paring process will be started.

If the user is not ready to initiate the pairing function, the user may instead select the "cancel" button 408. Selecting the "cancel" button 408 will stop any pairing function and return the user to the Manage Elements screen 410.

Figure 5:
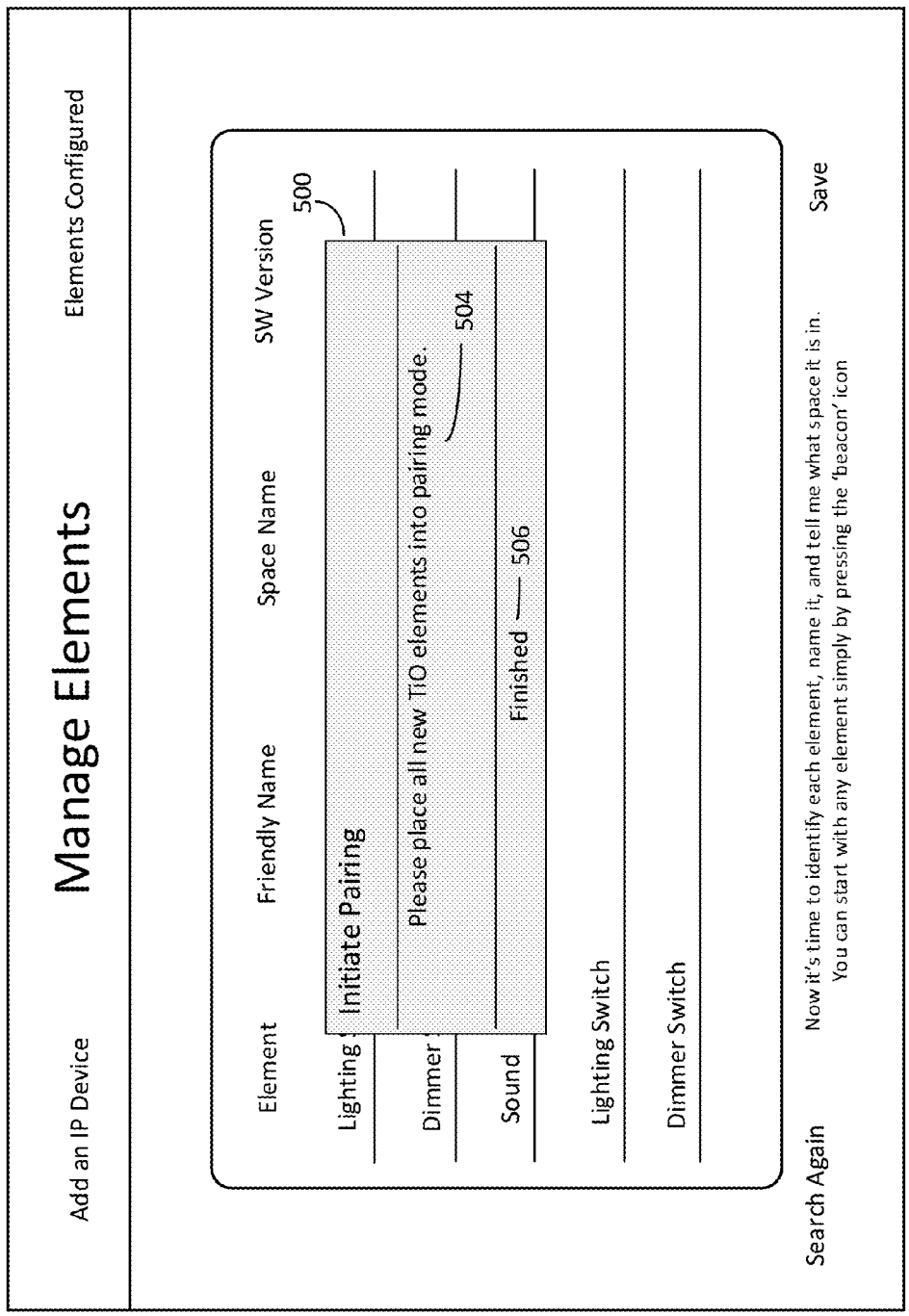
FIG. 5 is an exemplary view of a network pairing mode activation notification completion consistent with certain embodiments of the present invention.

Turning now to FIG. 5, this figure presents an exemplary view of a network pairing mode activation notification completion consistent with certain embodiments of the present invention. In this exemplary embodiment, upon an indication from the user that the pairing process should proceed, the user interface display screen presents an informational dialog box 500 indicating that the pairing process steps are being performed for each element in the element list. The user may be presented with an informational message such as "Please place all new TiO elements into pairing mode" or the like 504.

Upon completion of the pairing process, each network capable device, or element, will have been paired with first the association network established and maintained by the master control unit, followed by the association with an external network. The completion of the pairing will be indicated to the user by a "Finished" informational message 506.

While certain illustrative embodiments have been described, it is evident that many alternatives, modifications, permutations and variations will become apparent to those skilled in the art in light of the foregoing description.

What is claimed is:

1. A system, comprising:
a master control unit operable to communicate an association network name to one or more network capable devices;
each network capable device performing a calculation using a chosen, pre-configured algorithm to derive an association network passkey for said association network;
the master control unit establishing a network connection between the association network and each network capable device utilizing said association network passkey calculated and derived by said each network capable device;
the master control unit establishing a network connection between an exterior network server and the master control unit;
the master control unit operable to transmit the exterior network server name and passkey to each network capable device using the association network connection;
each network capable device replacing the name and passkey of the association network with the name and passkey of the exterior network server;
each network capable device removing the connection from the association network to the Master Control Unit;
each network capable device directly establishing a network connection between the exterior network server and each said network capable device; and
the Master Control Unit connecting to all network capable devices through the external network.

2. The system of claim 1, further comprising a master control unit initializing an association network within the master control unit.

3. The system of claim 1, where each network capable device is a device operable to control any of a light, light system, sound system, multimedia device, multimedia system, temperature control, network capable appliance, or any device installed to operate a device or system associated with a commercial or residential space.

4. The system of claim 1, where a user determines and supplies the exterior network name and passkey to the master control unit.

5. The system of claim 4, where the exterior network name is a Service Set Identifier (SSID).

6. The system of claim 1, where the determination of the association network passkey is the result of a calculation that is performed within the network capable device.

7. The system of claim 1, where each network capable device communicates directly with the exterior network after installing the exterior network name and passkey.

8. The system of claim 1, where each network capable device communicates with the master control unit utilizing the exterior network credentials after the exterior network name and passkey replace the association network name and passkey.

9. A method of pairing devices to an external network, comprising:
communicating an association network name from a master control unit to one or more network capable devices;
calculating and deriving, using a chosen, pre-configured algorithm, an association network passkey within each network capable device for said association network;
establishing a network connection between the association network and each network capable device utilizing said association network passkey calculated and derived by said each network capable device;
establishing a network connection between an exterior network server and the master control unit;
transmitting the exterior network server name and passkey from the master control unit to each network capable device using the association network connection;
replacing the name and passkey of the association network within each network capable device with the name and passkey of the exterior network server;
removing the network connection to said association network;
establishing a network connection directly between each said network capable device and the exterior network server; and
the Master Control Unit connecting to all network capable devices through the external network.

10. The method of claim 9, further comprising a master control unit initializing an association network within the master control unit.

11. The method of claim 9, where each network capable device is a device operable to control any of a light, light system, sound system, multimedia device, multimedia system, temperature control, network capable appliance, or any device installed to operate a device or system associated with a commercial or residential space.

12. The method of claim 9, where a user determines and supplies the exterior network name and passkey to the master control unit.

13. The method of claim 12, where the exterior network name is a Service Set Identifier (SSID).

14. The method of claim 9, where determining the association network passkey is the result of a calculation that is performed within the network capable device.

15. The method of claim 9, where each network capable device communicates directly with the exterior network after installing the exterior network name and passkey.

16. The method of claim 9, where each network capable device communicates with the master control unit utilizing the exterior network credentials after the exterior network name and passkey replace the association network name and passkey.

* * * * *